United States Patent [19]

Bayly

[11] Patent Number: 5,746,576
[45] Date of Patent: May 5, 1998

[54] WIND ENERGY CONVERSION DEVICE WITH ANGLED GOVERNING MECHANISM

[75] Inventor: Elliott Bayly, Duluth, Minn.

[73] Assignee: World Power Technologies, Inc., Duluth, Minn.

[21] Appl. No.: 662,995

[22] Filed: Oct. 15, 1996

[51] Int. Cl.⁶ .................................................. F03B 7/00
[52] U.S. Cl. .................................................. 416/16; 416/12
[58] Field of Search .................................. 416/9, 12, 13, 416/14, 16, 32

[56] References Cited

U.S. PATENT DOCUMENTS

| | | | |
|---|---|---|---|
| 543,462 | 7/1895 | Bramwell | 416/9 |
| 1,698,709 | 1/1929 | Bucklen et al. | |
| 1,746,991 | 2/1930 | Bucklen | |
| 1,767,303 | 6/1930 | Miller | |
| 1,903,534 | 4/1933 | Rime | |
| 2,026,828 | 1/1936 | Dunn | |
| 2,052,816 | 9/1936 | Dunn | |
| 2,094,917 | 10/1937 | Dunn | |
| 2,140,152 | 12/1938 | Dunn | |
| 2,207,964 | 7/1940 | Albers | |
| 4,297,075 | 10/1981 | Jacobs et al. | |
| 4,439,105 | 3/1984 | Hohenemser | |
| 4,449,889 | 5/1984 | Belden | 416/16 |
| 4,518,312 | 5/1985 | Jacobs et al. | |
| 4,767,939 | 8/1988 | Calley | |
| 5,295,793 | 3/1994 | Belden | |

FOREIGN PATENT DOCUMENTS

120788   7/1984   Japan ........................................ 416/16

Primary Examiner—Thomas E. Denion
Attorney, Agent, or Firm—Haugen and Nikolai, P.A.

[57] ABSTRACT

A wind energy conversion device includes a support frame that pivots on a vertical yaw axis, and a rotor/bushing assembly coupled to the support frame through a governing coupling that permits the rotor/bushing assembly to pivot on a governing axis relative to the support frame. The governing axis is inclined from the vertical preferably by about 30° to provide a substantial gravitational bias of the rotor/bushing assembly toward a normal operating position when wind velocities are below a predetermined threshold. The governing axis also is laterally offset from a drive axis about which the wind rotates a propeller of the rotor/bushing assembly. This facilitates alignment of the rotor/bushing assembly so that the drive axis intersects the yaw axis. As a result, wind induced thrust does not generate a torque about the yaw axis. Wind velocities above the threshold pivot the rotor/bushing assembly counter to the gravitational force, thus to move a propeller structure of the rotor/bushing assembly out of its normal orientation perpendicular to the wind direction, thus reducing wind-induced thrust and rotational speed. A tail assembly, mounted to the support frame, maintains the support frame in a predetermined angular position relative to the wind direction as the rotor/bushing assembly pivots. In an alternative construction, the tail assembly is mounted to the rotor/bushing assembly, so that governing action pivots and tilts the tail assembly.

25 Claims, 9 Drawing Sheets

WIND ENERGY CONVERSION DEVICE WITH ANGLED GOVERNING MECHANISM

BACKGROUND OF THE INVENTION

The present invention is directed to systems and devices for converting wind energy to electrical or mechanical power, and more particularly to governing apparatus for protecting such systems and devices from damage due to abnormally high wind velocities.

Wind energy conversion devices, largely due to improved blade materials and aerodynamics, more reliability throughout and improved generator/alternator magnets, are increasingly favored as a lower cost and more environmentally sound approach to generating electricity. In remote areas where power transmission over electrical lines is impractical or impossible, wind energy conversion devices may be the sole source of electric power, or a less costly source than fossil fueled generators. Further, they are a useful supplemental or substitute power source, even when power transmission lines are readily available. Beyond generating electrical power, these devices are also used to provide direct mechanical power via gear trains and other mechanisms drivably coupled to the rotor or shaft driven by the wind.

All such devices, however, are subject to variations in wind velocities. Calm weather entails velocities insufficient to generate useful mechanical or electrical power. At the opposite extreme are high wind velocities (e.g. 60 mph) that can drive movable components excessively beyond normal operating tolerances, damaging the mechanical or electrical components of the device. The energy or force due to the wind increases in proportion to the cube of the velocity. Thus, during a 60 mph gust of wind a device is subject to forces eight times the forces experienced during a 30 mph wind. Given the prohibitive cost of designing components that withstand the extreme forces, the affordable alternative is a governing mechanism to reduce the effect of the extreme forces.

A wide variety of governing schemes have been developed. These include whole blade pitching mechanisms, air foil spoilers or flaps, blade tip brakes and ailerons. Of greater interest in the present context is a class of governors that passively rotate the propeller plane out of the direct path of the wind. In general there are two categories of this type of governor. The first is known as a horizontally governing or folding-tail approach. Typically a propeller assembly and a tail assembly pivot relative to one another about an essentially vertical governing axis, with a drive axis of the propeller assembly offset from the vertical tower axis or "yaw" axis. As a result, wind at increasing velocity tends to rotate the propeller assembly about the yaw axis, against the tendency of the tail assembly to maintain its angular position relative to the wind direction. As wind velocity increases, such rotation progressively moves the propeller plane from its maximum efficiency position perpendicular to the wind direction, thereby reducing the wind thrust. Examples of this approach are found in U.S. Pat. No. 1,746,991 (Bucklen) and U.S. Pat. No. 4,297,075 (Jacobs).

The horizontal offset of the tower axis from the drive axis reduces efficiency, because any wind, no matter how low the velocity, generates a torque that tends to rotate the propeller assembly and tail assembly about a vertical yaw axis of the device. Attempts to overcome this problem include an extra vane as in U.S. Pat. No. 1,903,534 (Rime), and a bevel gear arrangement to promote pivoting responsive to rotor torque as in U.S. Pat. No. 1,767,303 (Miller). These devices, in and of themselves, are drains on the available energy.

The second general category of governor for wind energy conversion devices is known as a vertical governing or vertical tilting type, disclosed for example in U.S. Pat. No. 2,026,828 (Dunn) and U.S. Pat. No. 4,767,939 (Calley). In these devices the governing axis is horizontal, so that with increasing wind velocities the propeller and drive assembly tend to pivot vertically upward out of the normal wind-facing operating position.

These devices are subject to design restrictions, such as the need to prevent the tilting propeller from contacting the tail, which restricts the tail steering area to points below the area occupied by the propeller in the fully governed position, degrading performance and limiting design options. In designs where the tail tilts downwardly as the propeller tilts upward, the effective steering moment is lost during governing, leading to excessive rotation about the yaw axis. Further, rotor torque plays an undesirable role in vertically tilting governors, by tending to rotate the propeller assembly about the yaw axis during governing. Frequently this can lead to oscillatory behavior in which the propeller assembly tilts partially back at high rpm and rotor torque, yaws further out of the wind because of the torque, then slows down and yaws back toward confronting the wind.

Finally, the load springs acting on propeller assemblies in both types of governors are subject to wear, and excessive accumulation of force as a spring with a given spring constant is increasingly compressed or extended.

Therefore, it is an object of the present invention to provide a governing device for a wind energy conversion apparatus that can function effectively without loading springs, either in compression or in tension.

Another object is to provide a governing device for a wind power generator capable of biasing the propeller assembly into a normal operating position entirely due to gravity, yet is not subject to the oscillatory behavior characteristic of vertically tilting governors at high wind velocities.

A further object is to provide a governing device for a wind energy conversion system that permits selective beneficial use of rotor torque as a factor to either control rpm or to enhance governing.

It further is an object to provide a governing mechanism having the performance advantages of the horizontally governing type, that also eliminates the horizontal offset of the propeller axis from the yaw axis, avoiding the energy penalty due to the wind force rotating the propeller plane away from its most efficient angular position, i.e. perpendicular to the wind direction.

Yet another object is to provide a more efficient, simpler and lower cost governing device for a wind energy conversion system.

SUMMARY OF THE INVENTION

To achieve these and other objects, there is provided a wind energy conversion apparatus. The apparatus includes a rotor shaft and a propeller structure mounted to the rotor shaft for transferring a wind-induced torque to the rotor shaft to rotate the rotor shaft about a drive axis and provide a wind-induced thrust acting along the drive axis. The apparatus further includes a support assembly for supporting the rotor shaft. The support assembly is comprised of: (i) a support frame mounted to pivot on a substantially vertical yaw axis; (ii) a bushing structure supporting the rotor shaft for rotation about the drive axis; (iii) a speed-governing coupling for mounting the bushing structure to pivot relative to the support frame about a governing axis, in first and second opposite arcuate directions respectively toward and away from a normal operating position in which a vertical plane containing the drive axis is substantially parallel to a wind direction, wherein the governing axis is laterally offset from the drive axis, inclined at least about 20 degrees from the horizontal, and inclined from the vertical to bias the bushing structure in the first arcuate direction toward the normal operating position due to gravity; and (iv) a first stop means for preventing travel of the bushing structure in the first arcuate direction beyond the normal operating position. The conversion apparatus further includes a tail assembly mounted to the support assembly, extending away from the support assembly and tending to seek a selected angular alignment relative to the wind direction. The tail assembly thereby tends to pivot the support assembly about the yaw axis toward a selected angular position relative to the wind direction.

In a preferred approach, the tail assembly is mounted to the support frame and has a tail axis within a vertical tail assembly plane. The drive axis is substantially horizontal and parallel to the tail assembly plane. More preferably, in the normal operating position the yaw axis, the tail axis and the drive axis all lie in the same plane, with the drive axis and tail axis both intersecting the yaw axis. Then there is no horizontal offset of the drive axis and tail axis in the normal operating position, leading to improved efficiency under normal, non-governed operating conditions.

As an alternative, the tail assembly can be mounted directly to the bushing structure, in which event the tail assembly pivots with the bushing structure about the governing axis.

Inclining the governing axis at least about 27 degrees from the horizontal substantially diminishes the undesirable oscillation and torque effects characteristic of vertical tilting governors. Even more preferably, the governing axis is inclined at least 45 degrees from the horizontal. An angular offset of the governing axis from the vertical is required for gravitational biasing of the bushing structure toward the normal operating position. The degree of tilt of course influences the degree of such bias. Generally the governing axis is inclined from the vertical at least 10 degrees, and more preferably at least 18 degrees. The governing axis also is horizontally offset from the drive axis, facilitating effective governing combined with the most efficient alignment of the drive, tail and yaw axes as previously noted.

In short, there is a preferred range of inclination from about 27 to about 72 degrees from the horizontal (30–80 percent vertical), with governors having lower or "more horizontal" inclines tending to behave more like vertically tilting governors, and vice versa.

The propeller structure can be configured to rotate the drive shaft in a direction that either promotes or counteracts movement of the bushing means in the second arcuate direction, i.e. either to promote or to counteract governing. When counteracting governing, rotor torque tends to bias the propeller plane toward its wind-confronting angle despite increasing wind velocities, but also helps prevent rotor overspeed by tilting the propeller axis further away from the wind in the event of an intentional or accidental load loss.

If desired, the propeller structure and rotor can be inclined in the normal operating position for tower clearance, e.g. to incline the drive axis at an angle of 1–8 degrees from the horizontal. Typically the governing axis is also inclined so that it remains parallel to the propeller plane, but the governing axis need not be inclined to match the tower clearance tilt. In either event, the governing action is essentially the same.

The inclination of the governing axis from vertical, and its horizontal offset from the drive axis, can be selected with reference to the design thrust on the drive shaft as a function of wind velocity. In effect, setting these parameters selects a threshold wind velocity at which the moment about the governing axis due to thrust overcomes the force of gravity to pivot the rotor shaft and the bushing structure out of the normal, non-governed position. A typical threshold velocity is 25 mph, although anticipated wind conditions and design parameters call for a range of appropriate threshold velocities.

Thus in accordance with the present invention, a governing device for wind energy conversion systems can function entirely by gravity, without springs or other mechanical loading devices, although such devices can be added to influence the governing response if desired. At the same time, the governing device can operate free of the oscillation tendency and excessive yaw rotation characteristic of vertically tilting governors. Because of the horizontal offset of the governing axis, the governing device operates without the need to offset the drive axis from the yaw or tower axis. Reliance on gravity reduces the cost and complexity of the governing device, and provides smoother, more predictable behavior under varying wind conditions. Rotor torque can be used to control rpm or to enhance governing action. Governing action is subject to the degree of tilt of the governing axis, the weight of the rotor and bushing structure, and location of the bushing structure/rotor center of mass relative to the governing axis, to provide a considerable degree of freedom in selecting design parameters.

IN THE DRAWINGS

For a further understanding of the above and other features and advantages, reference is made to the following detailed description and to the drawings, in which.

DETAILED DESCRIPTION OF THE PREFERRED EMBODIMENTS

Figure 1:
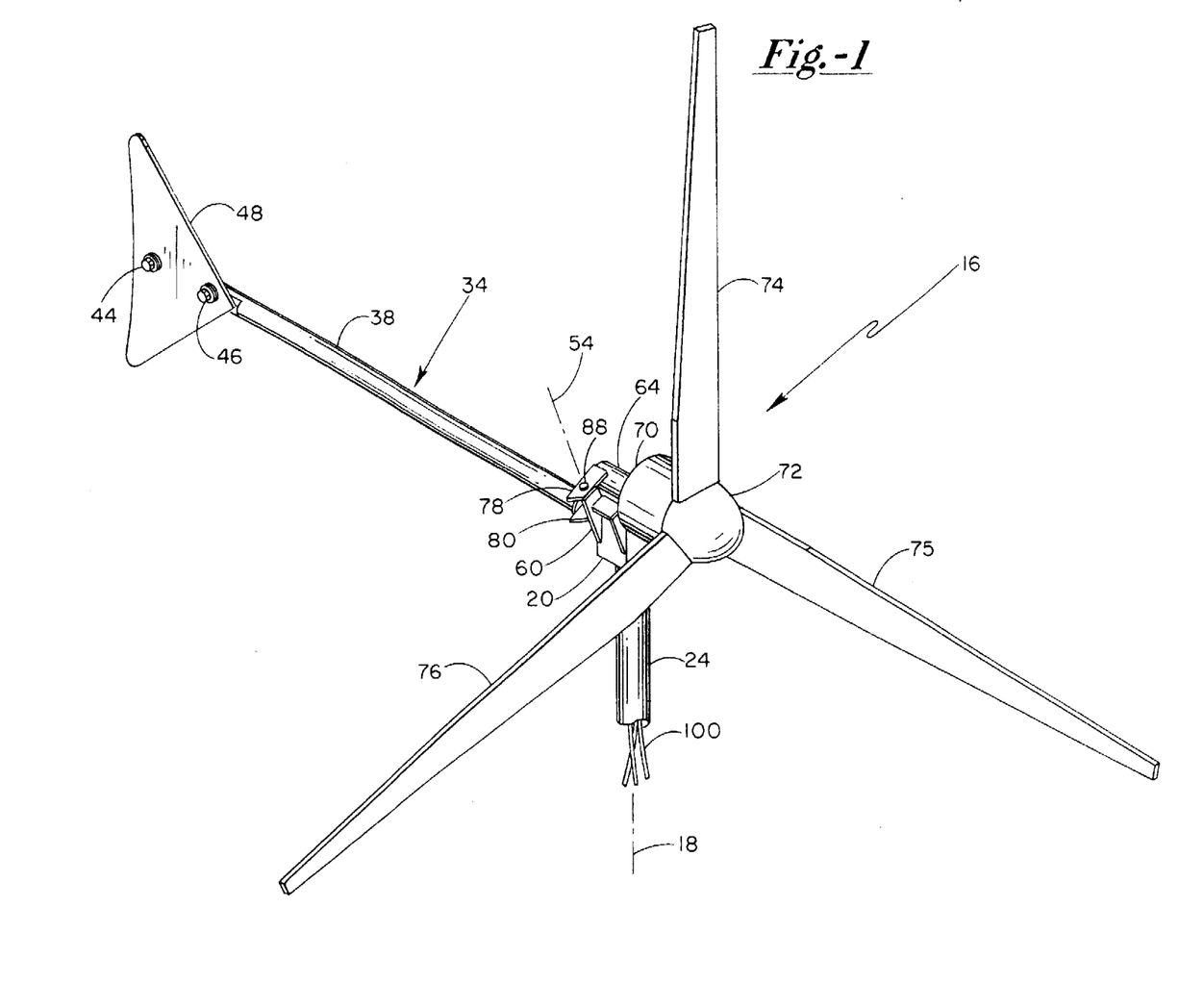
FIG. 1 is a perspective view of a wind energy conversion device constructed according to the present invention.
Figure 2:
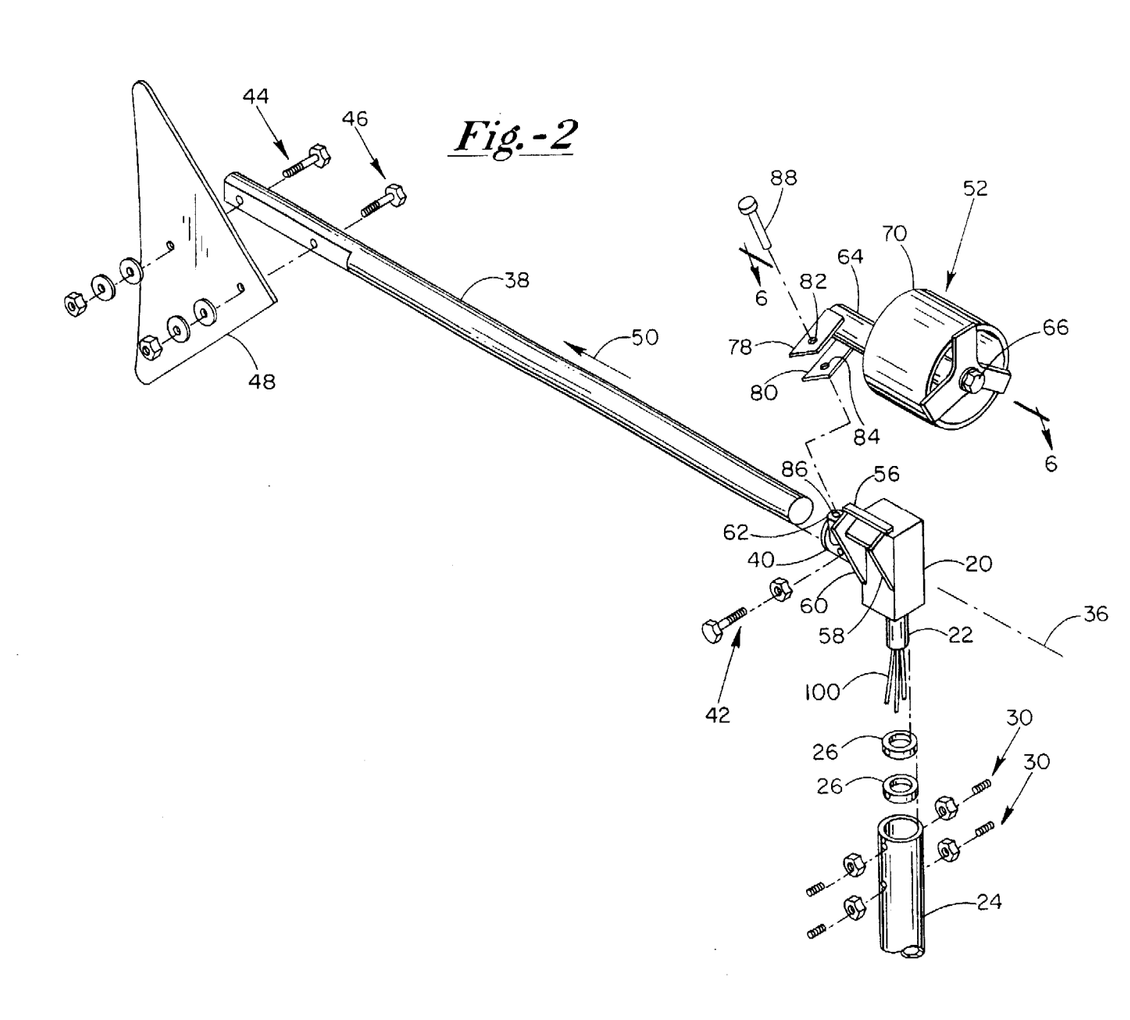
FIG. 2 is an exploded parts view of the wind energy conversion device (propeller removed)

Turning now to the drawings, there is shown in FIGS. 1–8 a wind energy conversion device 16. FIG. 2 shows the device in an exploded-parts view. Typically, device 15 is mounted on a tower (not shown) to pivot on a vertical axis 18 referred to as the yaw axis. More particularly the device includes a support frame or yaw frame 20 with a downwardly depending yaw shaft or vertical column 22 mounted within a vertical pipe or sleeve 24 of the tower through bushings 26 and 28. Fastener assemblies 30 secure the bushings. The vertical sleeve is at the top of the tower. Ball bearings (not shown) located inside support frame 20 allow the frame to rotate on yaw shaft 22, about yaw axis 18.

A tail assembly or rudder assembly 34 is secured to support frame 20 and extends away from the support frame along a horizontal tail axis 36 (FIG. 2). The tail assembly includes an elongate tail shaft 38, the proximal end of which is secured within a tail mounting sleeve 40 of the support frame by a fastener assembly 42. At the distal end of the tail shaft, fastening assemblies 44 and 46 secure a tail vane 48.

The tail assembly, particularly due to tail vane 48, tends to seek an angular alignment downwind of support frame 20 thus to maintain the support frame at a selected angular position relative to the wind direction. More particularly, tail vane 48 aligns tail shaft 38 into parallelism with the wind direction, with wind blowing from the proximal end of the shaft toward the distal end as indicated by the arrow at 50.

Figures 3, 4:
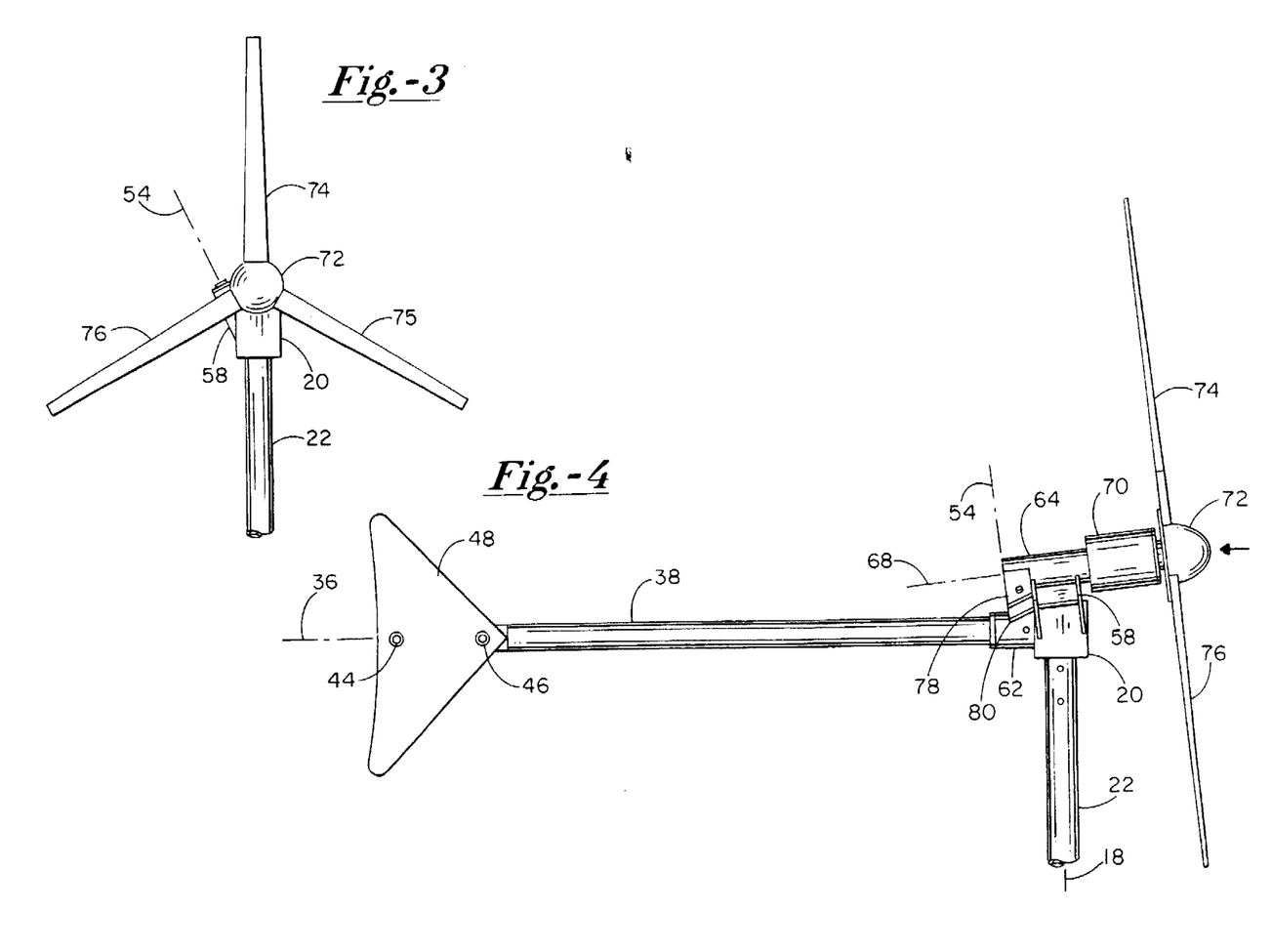
FIG. 3 is a front elevation of the device.
FIG. 4 is a side elevation of the device in its normal operating position.

A rotor/bushing assembly 52 is mounted to support frame 20, to pivot relative to the support frame about a governing axis 54 (FIGS. 3 and 4). Frame 20 has a support structure including a plate 56, forward and rearward inclined support members 58 and 60 fixed to the plate, and a governing sleeve 62 secured to rearward inclined member 60.

Figure 5:
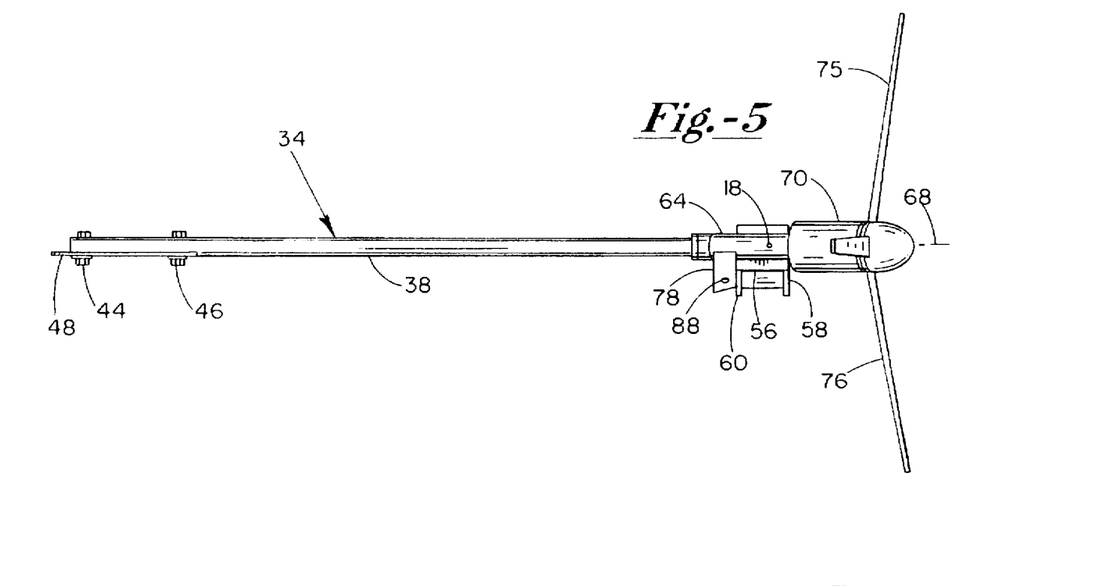
FIG. 5 is a top view of the device.

Assembly 52 has a bushing structure including an elongate rotor sleeve 64. Sleeve 64 supports a rotor shaft 66 (FIG. 6) for rotation about a substantially horizontal drive axis 68 (FIGS. 4 and 5). An alternator casing 70 is coaxial with and surrounds the rotor sleeve. At the forward end of the casing is a nose cone 72. A propeller structure integral with rotor shaft 66 includes three propeller blades 74, 75 and 76.

Upper and lower rotor sleeve mounting brackets 78 and 80 extend away from a rearward end of the rotor sleeve in a direction perpendicular to the drive axis. Brackets 78 and 80 are spaced apart from one another a distance slightly greater than the length of governing sleeve 62, so that the brackets are positionable adjacent opposite ends of the sleeve, with openings 82 and 84 of the brackets aligned with an opening 86 through sleeve 62. A pin 88 extends through openings 82–86 when the brackets and sleeve are so aligned, thus to mount the bushing structure for pivoting with respect to support frame 20 about the governing axis.

As best seen in FIG. 3, governing axis 54 is inclined from a vertical plane containing tail axis 36, by an angle of about 30 degrees—in other words, about 60 degrees from the horizontal. Considering drive axis 68 (shown as a point in FIG. 3) as a longitudinal axis, governing axis 54 is transversely or laterally offset from the drive axis. Thus, wind thrust acting along drive axis 68 tends to pivot assembly 52 about governing axis 54 relative to the support frame. As is later explained, gravity alone can prevent such pivoting until wind velocity exceeds a predetermined threshold, so that under normal operating conditions (speeds below the threshold) the components are aligned as shown in FIG. 3.

Further, it is apparent from FIG. 3 that under normal operating conditions, the vertical plane containing tail axis 36 also contains drive axis 68 and yaw axis 18. Thus, under normal operating conditions the wind thrust acts within this common plane, creating no moment arm to rotate support frame 20 or assembly 52 about the yaw axis. This increases efficiency as compared to conventional folding tail designs.

As seen in FIG. 4, drive axis 68 is slightly offset from the horizontal, and a plane containing propeller blades 74–76 is offset from the vertical by the same angle. This offset, typically 1–8 degrees, is for tower clearance, to avoid any interference between the propeller blades and the tower structure. More particularly, the tilt reduces the distance by which the propeller and alternator need to be longitudinally spaced apart from the yaw axis. Even when at the 8° maximum, the clearance tilt has little impact on performance, as compared to a horizontal drive axis/vertical propeller plane design.

It further is apparent from FIG. 4 that inclined support members 58 and 60 likewise reflect the clearance tilt. Consequently governing axis 54 is parallel to the propeller plane, i.e. with the same offset from the vertical as that plane, in addition to the approximately 30° offset shown in FIG. 3. This need not be the case, however. Without substantially affecting performance, sleeve 62 and brackets 78 and 80 can be positioned to define a governing axis that would appear as a vertical line in FIG. 4.

The alignment of drive axis 68 and tail axis 36 in a common vertical plane under normal operating conditions is best seen in FIG. 5. Tail assembly 34 and governing axis 54 (pin 88) are downwind of yaw axis 18, while the propeller structure including blades 74–76 is upwind of the yaw axis. The center of mass of assembly 52 also is upwind of the yaw axis, due primarily to the weight of the propeller structure and an alternator/rotor assembly that includes casing 70.

Figure 6:
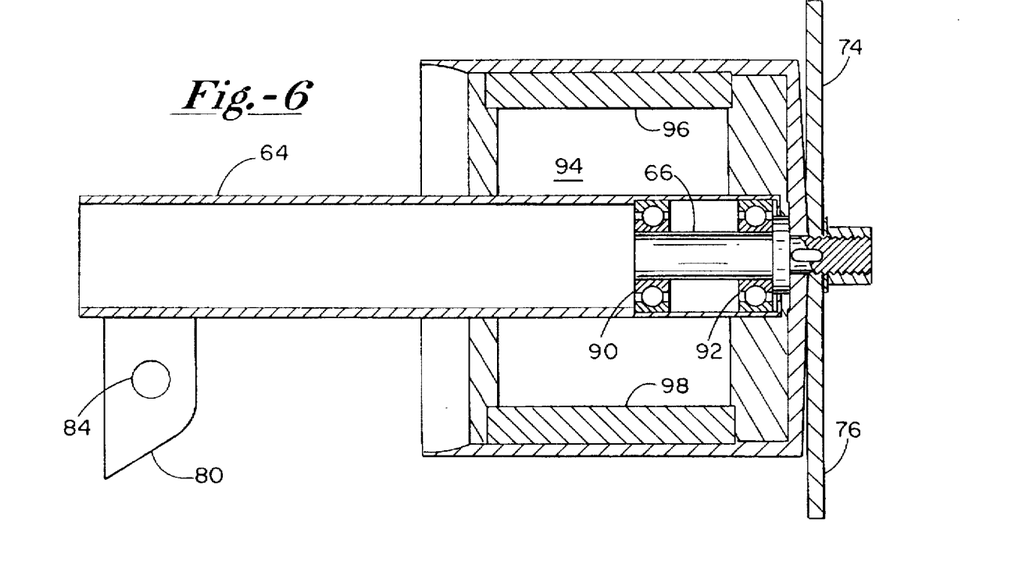
FIG. 6 is a sectional view taken along the line 6—6 in FIG. 3.

The alternator/rotor assembly, as shown in FIG. 6, includes rotor shaft 66 supported rotatably within rotor sleeve 64 by bearings 90 and 92. Immediately surrounding sleeve 64 and integral with the sleeve is a stator 94 formed of insulated copper wire windings. Casing 70 surrounds stator 94, but is integral with rotor shaft 66 and rotates with the shaft and propeller assembly. A set of permanent magnets, two shown at 96 and 98, are mounted to the inside surface of casing 70. When casing 70 rotates responsive to the wind, the moving magnetic field due to the magnets interacts with the stator windings to generate the desired electrical current, which is provided to the intended use via conductors 100 (FIG. 2) electrically coupled to the stator windings. More specifically, conductors 100 are coupled to the stator through a brush and slip ring (not shown) that maintain the electrical coupling while permitting the stator to pivot with support frame 20 about the yaw axis.

As mentioned above, normal operating conditions contemplate wind velocities up to a predetermined threshold, e.g. 25 mph. If the propeller plane continues to confront the wind during episodes of velocities above the threshold, excessively high levels of thrust and rpm can overload electrical components and subject structural components to undue stress and strain, risking serious and permanent damage to these components.

To minimize the risk of damage, rotor/bushing assembly 52 is configured to pivot about governing axis 54 in response to wind velocities beyond the threshold. This pivots the propeller plane away from the normally perpendicular relation to the wind direction, even while tail vane 48 maintains the angular position of support frame 20 with respect to the wind. As wind velocity increases further above the threshold, the degree of pivoting increases, until the bushing assembly reaches, a fully governed position illustrated in FIG. 8. When velocities fall below the threshold, the bushing structure returns to the normal operating position shown in FIG. 4.

In device 16, the bushing structure is continually urged into the normal operating position due to gravity alone; there need be no springs or other biasing members. Governing occurs when the wind induced thrust creates a rotational moment about governing axis 54 sufficient to overcome the gravitational force. For a given rotor/bushing assembly, this depends on the governing axis tilt and its lateral offset from the drive axis.

Figure 7:
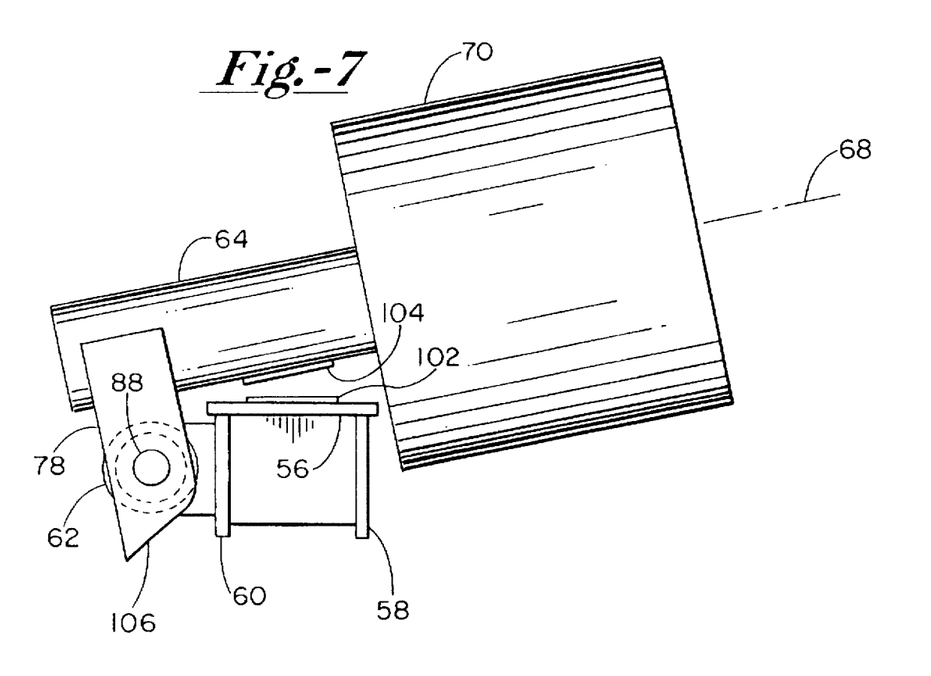
FIG. 7 is an enlarged view of a portion of the device, taken from a plane normal to the governing axis.
Figure 8:
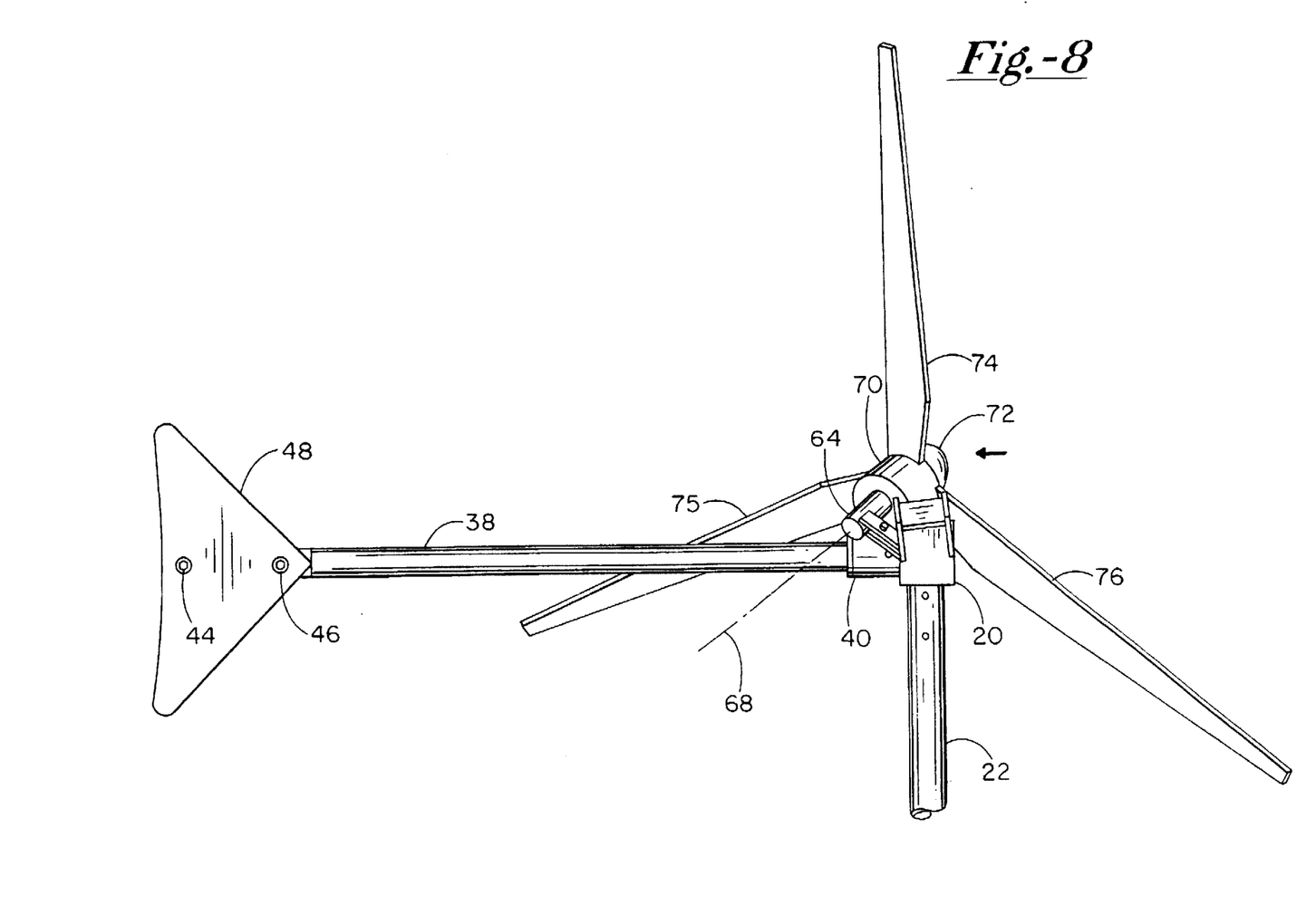
FIG. 8 is a side elevational view of the device in a fully governed position.

FIG. 7 shows portions of support frame 20 and assembly 52, with the assembly in a partially governed position to reveal a space between a pad 102 on plate 56 and a pad 104 mounted to rotor sleeve 64. Because of the incline of governing axis 54, gravity biases sleeve 64 toward plate 56. Thus, pads 102 and 104 together function as a stop that determines the normal operating position of assembly 52, by preventing the rotor/bushing assembly from rotating clockwise (as viewed in the figure) beyond the normal operating position.

Another stop is provided for determining the fully governed position, by preventing assembly 52 from rotating counterclockwise beyond that position. In particular, upper bracket 78 is formed with an inclined edge 106 remote from rotor sleeve 64. Bracket 80 has a similar edge aligned with edge 106. As assembly 52 is pivoted counterclockwise into the fully governed position, edge 106 (and its counterpart on bracket 80) are moved into surface engagement with inclined support member 60. Accordingly, the support member and brackets cooperate to provide the second stop.

Together, the two stops define a limited arc for bushing structure travel, in this case approximately 60-70°. The arcuate path can exceed 70° if desired. Regardless of the arcuate path length, the fully governed position is set to occur before assembly 52 reaches the zenith or "high point" of a full circular path (assuming no stop means in either direction) of the assembly center of mass, to ensure that even at the fully governed position, gravity biases the bushing structure back toward the normal operating position, i.e. in the clockwise direction as viewed in FIGS. 7 and 9–11. If spring force is added, the fully governed position can be extended beyond the high point.

Likewise, pads 102 and 104 are positioned to ensure that assembly 52 reaches a normal operating position before this structure (more particularly its center of mass) reaches the "low point" of the circular path. This, in turn, ensures the desired gravitational bias in the normal operating position.

The degree of gravitational bias, for a given weight and configuration of the rotor/bushing assembly, is determined by the governing axis. As this axis is inclined more from the vertical, the circular path of bushing structure travel becomes more inclined from the horizontal and thus has a larger vertical component, which increases the gravitational effect.

In terms of incline of the governing axis from the vertical, a broad range of angles is available to suit various design considerations. The incline from vertical must be at least sufficient to provide the gravitational bias, but not so large as to cause the oscillatory or erratic behavior characteristic of vertical tilting devices. For example, the incline from vertical can range from about 10 degrees to about 70 degrees. A more preferred range of incline from the vertical is from about 18 to about 53 degrees. Expressed another way, this preferred range can be thought of as from about 30 to about 30 percent of vertical. More preferably, the governing axis remains more vertical than horizontal, with the degree of incline from the vertical less than 45 degrees.

Primary design considerations that influence the governing axis tilt include the amount of gravitational bias required, and the preference for a more gentle (reduced shock and vibration) return to the normal position responsive to gain abrupt decrease in wind velocity. The first concern favors a larger incline, while the second concern favors a more gradual incline. Yet another consideration is the degree to which torque from propeller rotation is either allowed or intended to influence governing. More particularly, the greater the degree of incline from vertical up to about 45 degrees, the more pronounced is the effect of rotor/propeller torque.

As the above implies, the inclined governing axis permits use of rotor/propeller torque to influence governing behavior. With reference to FIG. 3, with governing axis 54 offset to the left of drive axis 68 as shown, and with the propeller configured to rotate counterclockwise, the upward tilt of the drive axis caused by governing action introduces a rotor torque component that resists further upward tilting of the drive axis. Thus, if during governing load is lost either accidentally or by design, the response to the loss of torque is for the drive axis to tilt more vertically, i.e. further away from the wind than if the load were present. This effect helps prevent rotor overspeed. The magnitude of this effect depends on the propeller blade length and the inclination of the governing axis. With reference to the preferred range of governing axis tilt from -he vertical, the torque effect is the least at the preferred minimum tilt of about 18 degrees, and increases to a maximum at about 45 degrees of tilt.

On the other hand, if propeller blades 74 and 76 are configured for clockwise rotation, rotor torque during governing augments governing by urging the drive axis to tilt away from the horizontal. This increases the governing response for a given tilt of the governing axis, assuming equality of other factors. Alternatively, this configuration can provide an equivalent governing action at greater degrees of governing axis incline from vertical. This permits a more positive gravitational hold at wind speeds below the threshold.

Figure 9:
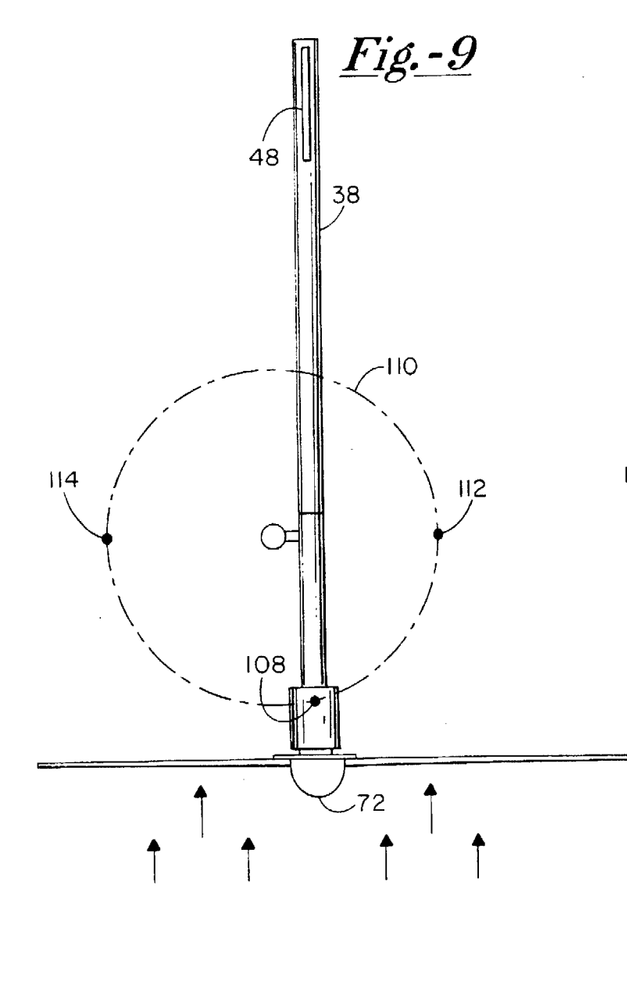
FIGS. 9–11 are schematic views from the plane normal to the governing axis, showing the device in respective normal, partially governed and fully governed states.
Figure 10:
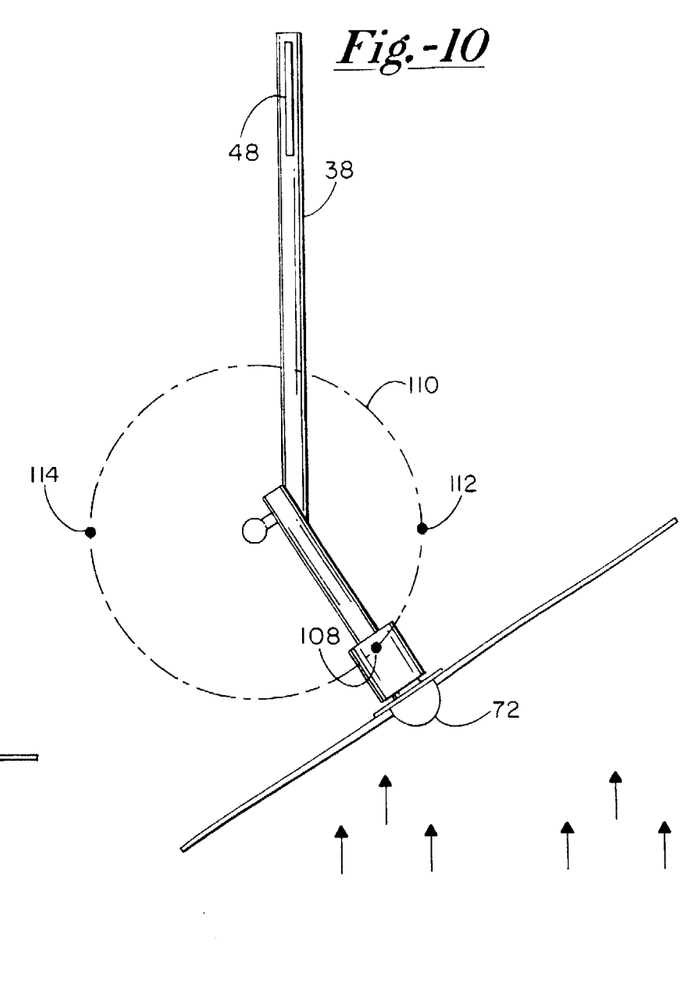
Figure 11:
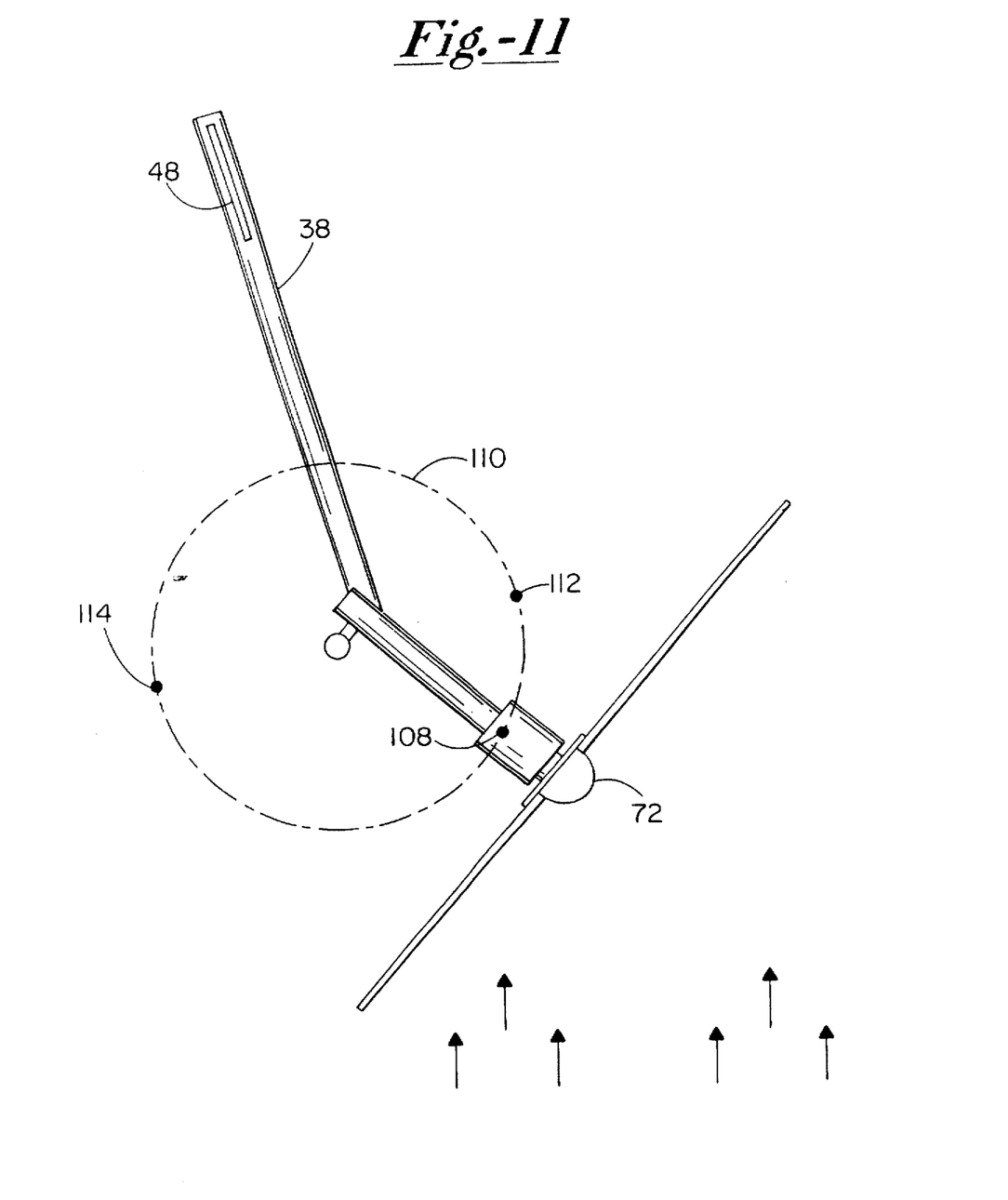

FIGS. 9, 10 and 11 are schematic top plan views of device 16 in the normal, partially governed and fully governed positions, respectively. At wind velocities of 0–25 mph (assuming 25 mph as the threshold velocity), the energy conversion device remains in the normal position, with drive axis 68, tail axis 36 and yaw axis 18 in the same vertical plane. The approximate center of mass of the bushing structure is indicated at 108. Gravity can be assumed to be acting upon the rotor/ bushing assembly at mass center 108, continually urging clockwise rotation about governing axis 54. The stop consisting of pads 102 and 104 prevents the bushing structure/rotor from rotating clockwise beyond the normal position. A circular path 110 for the mass center has respective high and low points 112 and 114.

In the normal configuration, the propeller structure fully faces the wind, i.e. propeller blades 74 and 76 as they rotate define a propeller plane that is perpendicular to the wind direction indicated by the arrow. There is no horizontal offset of the drive axis from the tail axis. The propeller plane remains perpendicular to the wind direction over the full range of normal, non-governed operation.

As wind velocities increase, e.g. to within a range of 25–35 mph, the moment arm about the governing axis due to wind induced thrust along the drive axis overcomes gravity and rotates the rotor/bushing assembly counterclockwise to the partially governed position. In FIG. 10, this position is exemplary, the precise position depending on the wind velocity. The effective propeller area facing the wind can be represented by a projection of the actual propeller plane onto a plane perpendicular to the wind velocity. As governing proceeds, the area of the projection decreases, which for a given wind velocity diminishes propeller rotational speed and thrust.

At full governing (FIG. 11), the rotor/bushing assembly has pivoted 60–70 degrees about the governing axis, and the projection of the propeller area is a small fraction of the actual area traversed by the propellers. Even at this point, wind thrust can cause additional pivoting of rotor/bushing assembly 52 with support frame 20 and tail assembly 34 about yaw axis 18, further reducing the projection of the propeller area. Such additional rotation includes rotation of tail assembly 34 as well, due to the contact of inclined edge 106 against inclined member 60. As seen in FIG. 11, such additional pivoting moves tail shaft 38 out of alignment with the wind direction. Thus, even at abnormally high wind velocities, rpm and thrust levels are kept sufficiently low to avoid damage to the device. As wind velocities subside, the bushing structure and rotor rotate clockwise toward the normal position, due solely to gravity. A significant advantage of this approach is that the return to normal is more gentle. Consequently, device 16 is less likely to require shock absorbers or damping mechanisms.

Figure 12:
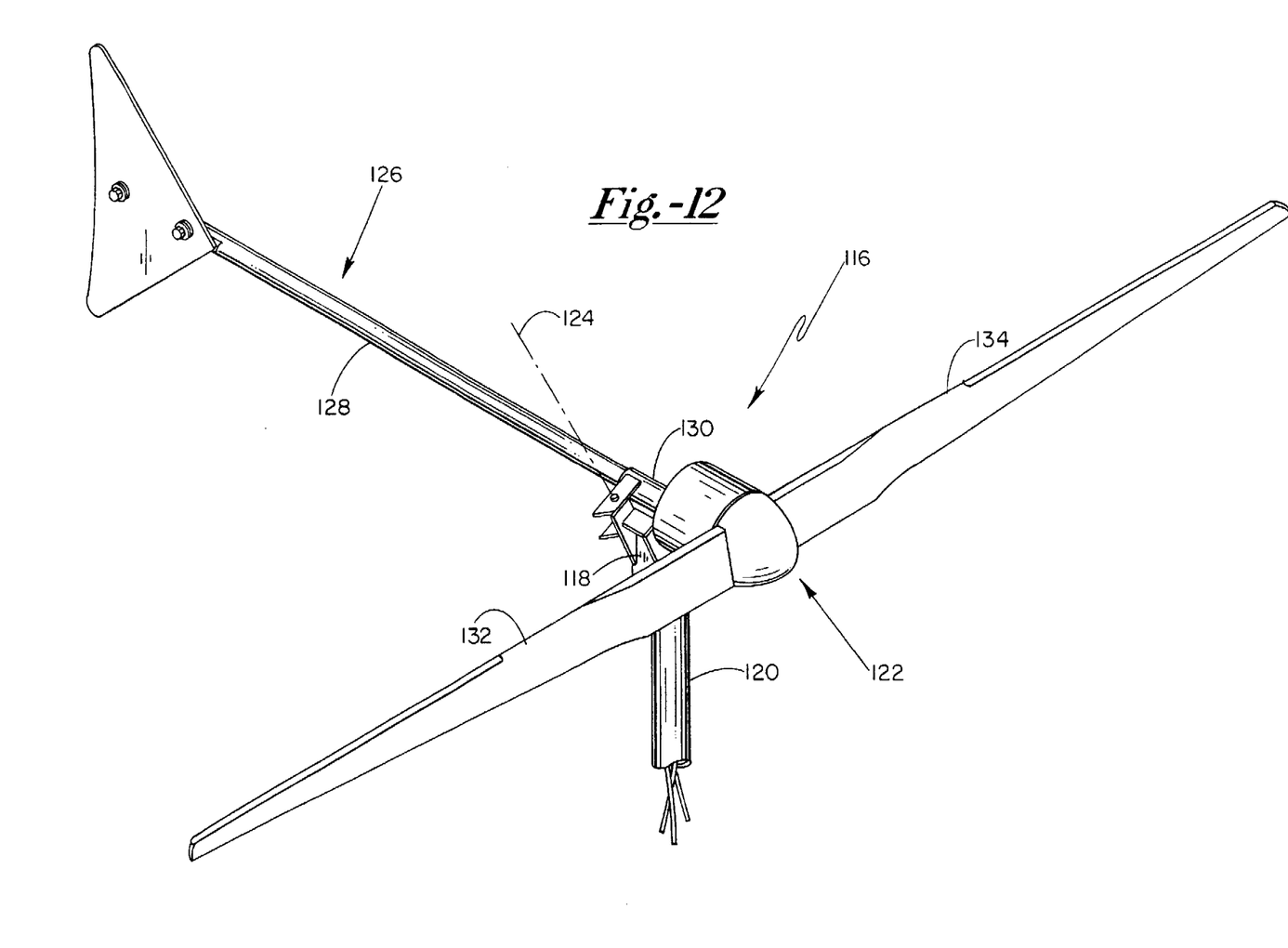
FIG. 12 is a perspective view of an alternative wind energy conversion device constructed according to the present invention.

FIG. 12 illustrates an alternative wind energy conversion device 116 including a support frame 118 mounted for rotation on a vertical sleeve 120, a rotor/bushing structure 122 mounted to pivot relative to the support frame on a governing axis 124, and a tail assembly 126. The arrangement differs from that illustrated in FIG. 1 in that a tail shaft 128 is secured within a rotor sleeve 130 of the rotor/bushing structure, so that the tail assembly pivots along with structure 122 during governing. Also, two propeller blades 132 and 134 are shown.

This arrangement permits designs in which the drive axis and tail axis not only are within the same vertical plane, but coincide. However, because these axes are integral in this design, the tendency of the tail assembly to remain downwind of the yaw axis acts against the governing action that pivots tail assembly 126 about the governing axis, away from the downwind location. The design is analogous in this respect to selecting a propeller rotation direction with torque that: resists governing. However, this force of the tail assembly is diminished by governing, due to a downward tilt of the tail assembly which becomes more pronounced as the governing axis tilt from the vertical is increased. In this configuration, the weight of the tail can be employed to counterbalance the weight of the rotor/bushing assembly to assist governing where such assembly (including generator) is particularly heavy, or where increased axial (longitudinal) displacement is desired for tower clearance.

While devices 16 and 116 rely exclusively on gravitational bias, spring force can be used to augment gravity if desired. Such need may arise, for example, in devices in which the governing axis is more toward the horizontal, i.e. inclined from the vertical by 45 degrees or more. In such devices, the gravitational resistance to governing action diminishes as the rotor/bushing assembly approaches the fully governed position. By contrast, a spring can be configured to provide a resistance to governing action that increases as the rotor/bushing assembly approaches the fully governed position. Or, a shorter spring can be positioned to augment the gravitational force only as the rotor/bushing assembly approaches the fully governed position.

Thus in accordance with the present invention, a governing mechanism has an inclined governing axis employing gravitational force to determine a threshold wind velocity at which governing is initiated, and to bias the propeller structure to fully confront the wind for maximum efficiency at wind velocities below the threshold. The governing axis further is inclined sufficiently from the horizontal to diminish rotor torque components that lead to oscillatory or otherwise erratic behavior in vertically governing machines.

The governing mechanism can be employed with a tail assembly mounted either to the support frame or to the bushing structure supporting the rotor shaft. In the former case, the incline of the governing axis can be combined with the lateral offset of the governing axis from the drive axis, to position the drive axis and tail axis in the same vertical plane as the yaw axis. This eliminates the energy production penalty due to the wind-induced moment arm about the yaw axis under normal, non-governed operation. Further, the direction of incline of the governing axis can be selected with respect to the direction of rotation of the propeller and rotor, so that the torque due to such rotation either assists governing or controls rpm as desired.

What is claimed is:

1. A wind energy conversion apparatus including:
   (a) a rotor shaft;
   (b) a propeller structure mounted to the rotor shaft for transferring a wind-induced torque to the rotor shaft to rotate the rotor shaft about a drive axis and provide a wind-induced thrust acting along the drive axis;
   (c) a support assembly for supporting the rotor shaft, comprised of:
      i. a support frame mounted to pivot on a substantially vertical yaw axis;
      ii. a bushing structure supporting the rotor shaft for rotation on the drive axis;
      iii. a speed-governing coupling for mounting the bushing structure to pivot relative to the support frame about a governing axis, in first and second opposite arcuate directions respectively toward and away from a normal operating position in which a vertical plane containing the drive axis is substantially parallel to a wind direction, wherein the governing axis is laterally offset from the drive axis, inclined at least about 20 degrees from the horizontal, and is inclined from the vertical to bias the bushing structure in the first arcuate direction toward the normal operating position due to gravity; and
      iv. a first stop means for preventing travel of the bushing structure in the first arcuate direction beyond the normal operating position; and
   (d) a tail assembly mounted to the support assembly and extending away from the support assembly along a tail axis, said tail assembly tending to seek a selected angular alignment relative to a direction of the wind, and thereby tending to pivot the support assembly about the yaw axis toward a selected angular alignment relative to said wind direction.

2. The apparatus of claim 1 wherein:
the tail assembly is integral with the support frame.

3. The apparatus of claim 2 wherein:
said tail assembly extends along tail axis within a vertical tail assembly plane, and the drive axis is parallel to the tail assembly plane when the bushing structure is in the normal operating position.

4. The apparatus of claim 3 wherein:
the drive axis and the yaw axis are contained within said tail assembly plane when in the normal operating position.

5. The apparatus of claim 1 wherein:
the drive axis and the yaw axis intersect one another.

6. The apparatus of claim 1 wherein:
the drive axis is substantially horizontal when the bushing structure is in the normal position.

7. The apparatus of claim 1 further including:
a second stop means for preventing arcuate travel of the bushing structure in the second direction beyond a fully governed position.

8. The apparatus of claim 7 wherein:

the first and second stop means cooperate to limit arcuate travel of the bushing structure to less than about 90 degrees.

9. The apparatus of claim 1 wherein:

said tail assembly is disposed downwind of the drive shaft, and on an opposite side of the yaw axis from the propeller structure.

10. The apparatus of claim 1 wherein:

the governing axis and the propeller structure are on opposite sides of the yaw axis.

11. The apparatus of claim 1 wherein:

said tail assembly is integral with the bushing structure.

12. The apparatus of claim 1 wherein:

the governing axis is inclined at least about 30 degrees from the horizontal.

13. The apparatus of claim 12 wherein:

said propeller structure is configured to rotate the drive shaft in a rotational direction selected such that torque due to propeller structure rotation counteracts movement of the bushing means in the second arcuate direction responsive to wind induced thrust on the drive shaft.

14. The apparatus of claim 12 wherein:

the propeller structure is configured to rotate the drive shaft in a direction selected such that the torque due to propeller structure rotation tends to move the bushing means in the second direction, thereby augmenting the tendency of wind-induced thrust on the drive shaft to move the bushing means in said second direction.

15. The apparatus of claim 1 further including:

an electrical energy generating means including a permanent magnet means integral with the rotor shaft, and a stator integral with the bushing structure and surrounding the rotor shaft proximate the permanent magnet means.

16. The apparatus of claim 1 wherein:

said speed-governing coupling includes a governor shaft integral with the bushing structure, and a governor sleeve integral with the support frame and concentrically mounted on the governor shaft for rotation relative to the governor shaft about the governing axis.

17. The apparatus of claim 16 wherein:

the speed-governing coupling further includes first and second brackets coupled to opposite end portions of the governor shaft on opposite sides of the governor sleeve, said brackets further being fixed to the bushing structure to selectively locate the rotor shaft with respect to the support frame such that the yaw axis and the drive axis intersect one another when the bushing structure is in the normal operating position.

18. The apparatus of claim 1 wherein:

the governing axis is inclined from the horizontal at an angle in the range of about 27 to about 12 degrees.

19. The apparatus of claim 18 wherein:

said governing axis is inclined at an angle of about 60 degrees from the horizontal.

20. The apparatus of claim 1 wherein:

said propeller structure includes a plurality of rotor blades symmetrically angularly separated from one another.

21. The apparatus of claim 1 wherein:

the propeller structure defines a propeller plane perpendicular to the drive axis, and the governing axis is parallel to the propeller plane.

22. The apparatus of claim 21 wherein:

the drive axis is inclined at an angle of at most about 8 degrees from the horizontal.

23. The apparatus of claim 1 wherein:

the inclination of said governing axis from the vertical is selected with reference to the thrust on the rotor shaft as a function of wind velocity and governing axis offset, thereby to select a threshold wind velocity at which said thrust overcomes a tendency of gravity to maintain the bushing structure in the normal operating position.

24. In a wind powered generator having a vertical support column, frame means coupled to the support column, and a propeller, generator and rudder assembly mounted on the frame means, and with said generator powered by the propeller, and with the rudder assembly being adapted to normally control an angular position of the propeller relative to the wind direction; a speed-governing means for the propeller for protection of the energy generator plant from damage due to high winds, comprising:

(a) a first pivotal mounting means for coupling the frame means to the support column, for rotation of the frame means relative to the support column about a yaw axis; and (b) a speed-governing means comprising a second pivotal mounting means for coupling the propeller and generator to the frame means, the second pivotal mounting means including a shaft defining a speed-governing axis disposed laterally of the frame means and angularly disposed from about 10 degrees to about 70 degrees from the yaw axis, and accommodating upwardly directed pivotal rotation of the propeller and generator about the laterally disposed speed-governing axis, thereby altering the orientation of the propeller relative to the wind direction to govern the rotational velocity of the propeller when exposed to winds of at least a predetermined threshold velocity.

25. A wind energy conversion apparatus, including:

a support frame mounted to pivot on a substantially vertical yaw axis;

a tail assembly mounted to the support frame and extending away from the support frame along a tail axis, for causing the support frame to pivot about the yaw axis toward a selected angular alignment relative to a wind direction, thereby tending to maintain the support frame in the angular alignment;

a rotor shaft, and a bushing structure supporting the drive shaft for rotation about a substantially horizontal drive axis, and a propeller structure mounted to the rotor shaft for transferring a wind-induced torque to the drive shaft to rotate the rotor shaft about the drive axis;

a speed-governing coupling for mounting the bushing structure to pivot relative to the support frame about a governing axis, in first and second opposite arcuate directions respectively toward and away from a normal operating position in which the drive axis is parallel to a vertical plane that contains the tail axis, wherein the governing axis is laterally offset from the drive axis, inclined at least about 20 degrees from the horizontal, and inclined from the vertical to bias the bushing structure in the first arcuate direction toward the normal operating position due to gravity; and a first stop means integral with the support frame for preventing travel of the bushing structure in the first arcuate direction beyond the normal operating position.

* * * * *